(12) United States Patent
Mizukoshi et al.

(10) Patent No.: US 12,535,878 B2
(45) Date of Patent: Jan. 27, 2026

(54) WEARABLE APPARATUS

(71) Applicant: NTT DOCOMO, INC., Tokyo (JP)

(72) Inventors: Yuuichi Mizukoshi, Chiyoda-ku (JP); Nobutaka Matsushima, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/720,766

(22) PCT Filed: Nov. 16, 2022

(86) PCT No.: PCT/JP2022/042541
§ 371 (c)(1),
(2) Date: Jun. 17, 2024

(87) PCT Pub. No.: WO2023/119966
PCT Pub. Date: Jun. 29, 2023

(65) Prior Publication Data
US 2025/0068233 A1    Feb. 27, 2025

(30) Foreign Application Priority Data
Dec. 24, 2021   (JP) ................. 2021-210412

(51) Int. Cl.
*G06F 3/01*    (2006.01)
*G02B 27/00*   (2006.01)
*G02B 27/01*   (2006.01)

(52) U.S. Cl.
CPC ......... *G06F 3/012* (2013.01); *G02B 27/0093* (2013.01); *G02B 27/0101* (2013.01);
(Continued)

(58) Field of Classification Search
CPC ....... G06F 3/012; G06F 3/01; G02B 27/0093; G02B 27/0101; G02B 27/017;
(Continued)

(56) References Cited

U.S. PATENT DOCUMENTS

| 8,847,850 B1 * | 9/2014 | Cho ........................ G06F 3/013 345/9 |
| 2014/0225812 A1 * | 8/2014 | Hosoya .............. G02B 27/0093 345/8 |
| 2021/0389587 A1 * | 12/2021 | Tsuruga .................... G06F 3/01 |

FOREIGN PATENT DOCUMENTS

| JP | 2015-87523 A | 5/2015 |
| JP | 2020-170249 A | 10/2020 |

OTHER PUBLICATIONS

Japanese Office Action issued Jan. 14, 2025 in Japanese Patent Application No. 2023-569168 (with unedited computer-generated English translation), 8 pages.
(Continued)

*Primary Examiner* — Brent D Castiaux
(74) *Attorney, Agent, or Firm* — Oblon, McClelland, Maier & Neustadt, L.L.P.

(57) ABSTRACT

A pair of AR glasses is a display device of a transmission type mountable to a head of a user. An image capture device outputs a captured image obtained by capturing an image of an area in front of the user. An inertia measurement device detects a physical quantity concerning the movement of the head of the user. A display controller displays on the pair of AR glasses a guide image indicating an outer edge of the captured image, in a display period from a start timing to an end timing determined based on at least an output signal from the inertia measurement device.

4 Claims, 7 Drawing Sheets

(52) U.S. Cl.
CPC .... *G02B 27/017* (2013.01); *G02B 2027/0138* (2013.01); *G02B 2027/0178* (2013.01)

(58) Field of Classification Search
CPC ............ G02B 27/02; G02B 2027/0138; G02B 2027/0178; G02B 2027/014; G02B 2027/0187; G09G 5/00; H04N 23/40; H04N 23/60; H04N 23/63
See application file for complete search history.

(56) References Cited

OTHER PUBLICATIONS

International Search Report issued Jan. 31, 2023 in PCT/JP2022/042541, filed on Nov. 16, 2022, 4 pages (with English Translation).

\* cited by examiner

WEARABLE APPARATUS

TECHNICAL FIELD

The present invention relates to wearable apparatuses.

BACKGROUND ART

Extended Reality (XR) glasses adopting XR technology have come into common use. Representative examples of the XR technology may include augmented reality (AR), virtual reality (VR), and mixed reality (MR) technologies. A pair of XR glasses may include an image capture device that captures an image of an area in front of a user. A captured image that is captured by the image capture device is used for, for example, presenting information for assisting work to be conducted by a user wearing the pair of XR glasses. The captured image is also used for, for example, a recording to be made for a later evaluation as to whether the user has appropriately conducted the work.

For example, Patent Document 1 listed below discloses a work support system for aligning a virtual object in a virtual space with an object in a real space, using a marker in the real space. Specifically, the work support system includes: a display device configured to display an image in a virtual space correlated to a real space; an image capture device configured to capture an image of an area within a range covering a center of a field of view of a user; a position information detector configured to detect a positional relationship between a marker and the image capture device, based on a captured image of the marker; and a display controller configured to control display of the image in the virtual space, based on a result of detecting an image of the marker with a line of sight directed to the marker and a result of mechanically detecting a posture of the user.

RELATED ART DOCUMENT

Patent Document

Patent Document 1: Japanese Patent Application, Laid-Open Publication No. 2020-170249

SUMMARY OF THE INVENTION

Problem to be Solved by the Invention

Typically, image capture devices mounted to a pair of XR glasses differ in resolution and mounting position for each product. Therefore, an imaging range which the user assumes is different from an actual imaging range in some cases. If the imaging range which the user assumes is different from the actual imaging range, there is a possibility that a captured image required for processing on the pair of XR glasses cannot be acquired.

In order to cope with this problem, it is also considered that a pair of XR glasses always displays a guide image showing an outer edge of an imaging range, for example. However, there is a problem in that the guide image hinders work or narrows a display region of the pair of XR glasses, for example.

The present invention is directed at achieving display of an imaging range of an image capture device, without interrupting a field of view of a user for a long time.

Means of Solving the Problems

According to an aspect of the present invention, a wearable apparatus includes: a display device of a transmission type mountable to a head of a user; an image capture device configured to output a captured image obtained by capturing an image of an area in front of the user; a sensor configured to detect a physical quantity; and a controller configured to display on the display device a guide image indicating an outer edge of the captured image, in a display period from a start timing to an end timing determined based on at least an output signal from the sensor.

Effect of the Invention

According to an aspect of the present invention, it is possible to display an imaging range of an image capture device without interruption of a field of view of a user for a long time.

MODES FOR CARRYING OUT THE INVENTION

A. Embodiment

A-1. System Configuration

Figure 1:
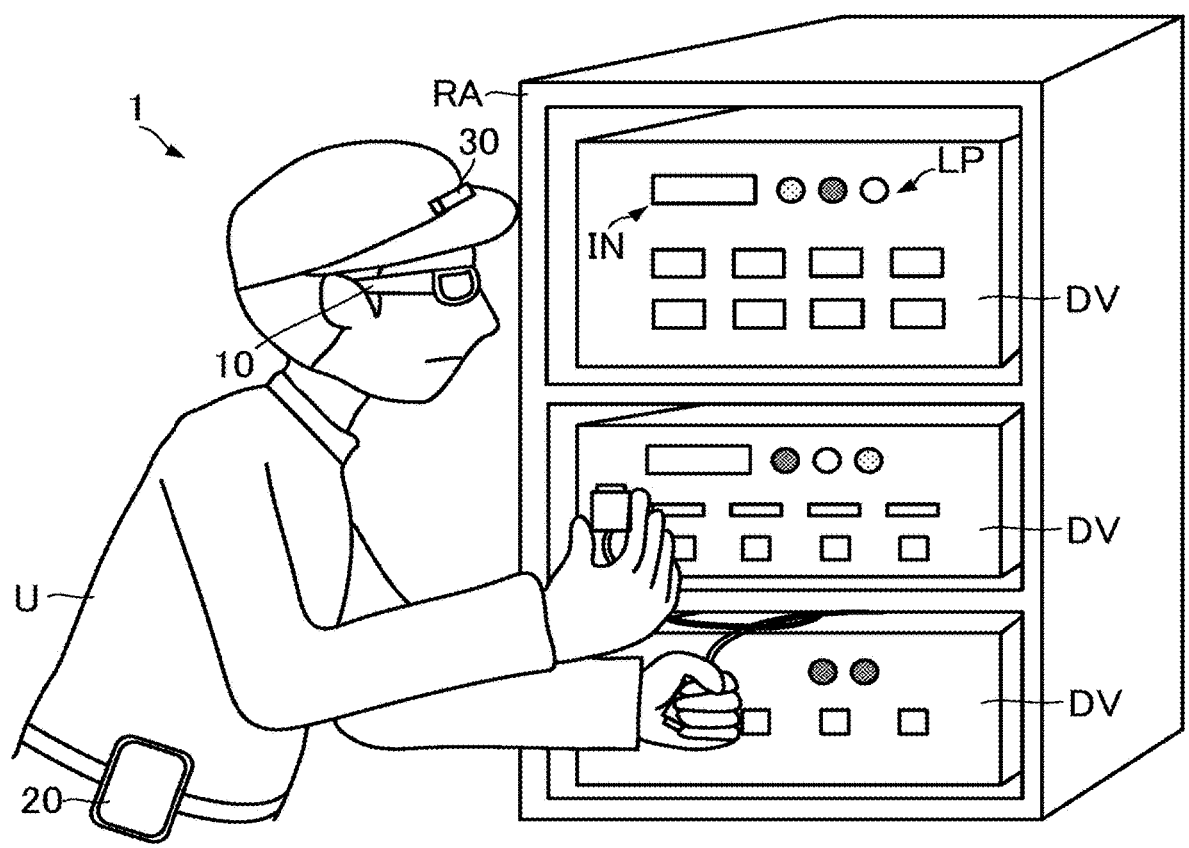
FIG. 1 is a diagram illustrating an outline of a wearable apparatus 1 according to an embodiment.
Figure 2:
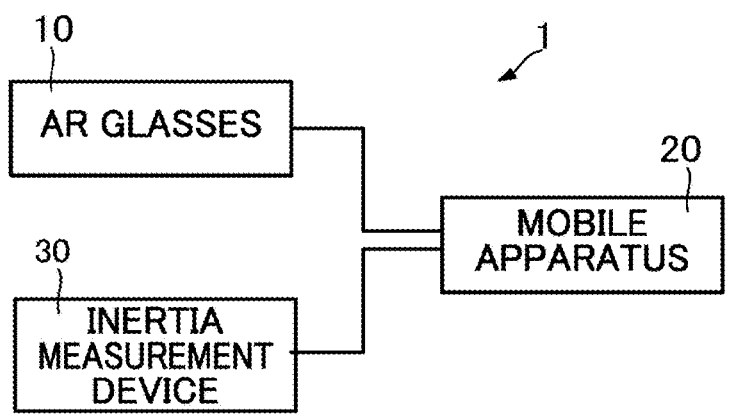
FIG. 2 is a block diagram illustrating a configuration of the wearable apparatus 1 according to the embodiment.

FIG. 1 is a diagram illustrating an outline of a wearable apparatus 1 according to an embodiment. FIG. 2 is a block diagram illustrating a configuration of the wearable apparatus 1 according to the embodiment. The wearable apparatus 1 includes a pair of AR glasses 10 mountable to the head of a user U, a mobile apparatus 20 which the user U carries, and an inertia measurement device 30 that measures the movement of the head of the user U.

In the present embodiment, the user U conducts wiring work between a plurality of apparatuses DV housed in a rack RA, while wearing the wearable apparatus 1. The wearable apparatus 1 includes an image capture device 124 (see FIG. 4). The wearable apparatus 1 stores a captured image that is captured by the image capture device 124, in a storage device 205 (see FIG. 5) of the mobile apparatus 20. The captured image shows how the user U conducts work on one or more apparatuses DV. Recording such a captured image enables later verification as to whether the contents and procedures of the work conducted by the user U were appropriate, and if a malfunction occurs, enables analysis of the reason the malfunction occurred. This improves convenience for the user U and a person who requested the work.

In addition, the wearable apparatus 1 may present an instruction manual of the wiring work to the user U. The wearable apparatus 1 may monitor whether one of the apparatuses DV is in an unusual state during the work, by a method of subjecting a captured image to image processing using artificial intelligence (AI).

A-2. Inertia Measurement Device 30

The inertia measurement device 30 calculates an acceleration of the head of the user U in each of three axes representing a three-dimensional space and an angular velocity of the head of the user U with each of the three axes defined as an axis of rotation, and outputs a measurement result in the form of an output signal, for example. The inertia measurement device 30 is an example of a sensor configured to detect a physical quantity. In the present embodiment, the inertia measurement device 30 detects a physical quantity concerning a movement of a head. Each of the acceleration and the angular acceleration is an example of a physical quantity concerning the movement of the head of the user U.

More specifically, the inertia measurement device 30 includes various sensors, a processor device, and a communication device. The various sensors include at least one of, for example, a gyro sensor, an acceleration sensor, a magnetic sensor, and a pressure sensor. The processor device calculates an acceleration in each of the three axes representing the three-dimensional space and an angular velocity with each of the three axes defined as the axis of rotation, using measurement values as results of measurements by the various sensors. The communication device is configured to communicate with at least a communication device 203 of the mobile apparatus 20. The communication device transmits to the mobile apparatus 20 an output signal including an acceleration and an angular velocity each calculated by the processor device. The inertia measurement device 30 transmits an output signal at predetermined measurement intervals.

In the present embodiment, the inertia measurement device 30 is mounted to headgear worn by the user U. Therefore, the inertia measurement device 30 measures an acceleration and an angular velocity each time the user U moves the user's head. The mobile apparatus 20 is configured to calculate a moving speed V of the head of the user U, using an output signal from the inertia measurement device 30, as will be described later.

In the present embodiment, the inertia measurement device 30 is mounted to the headgear worn by the user U. Alternatively, the inertia measurement device 30 may be incorporated in the pair of AR glasses 10, for example. In this case, a communication device 123 of the pair of AR glasses 10 transmits an output signal, and an acquirer 230 acquires the output signal via the communication device 203. The inertia measurement device 30 is not necessarily mounted to the headgear worn by the user U. A part where the inertia measurement device 30 is mounted is not limited as long as the part is movable in conjunction with the movement of the head of the user U.

A-3. AR Glasses 10

The pair of AR glasses 10 is a wearable display of a transmission type mountable to the head of the user U. The pair of AR glasses 10 is an example of a display device. The pair of AR glasses 10 displays a virtual object on a display panel provided on a left-eye lens 110A and a display panel provided on a right-eye lens 110B, based on control by the mobile apparatus 20. In the present embodiment, the pair of AR glasses 10 displays as the virtual object a guide image GI (GI1, GI2) showing an outer edge of a captured image captured by the image capture device 124, for example. The display device may be, for example, a goggles-type transmission head-mounted display having the same function as the function of the pair of AR glasses 10.

Figure 3:
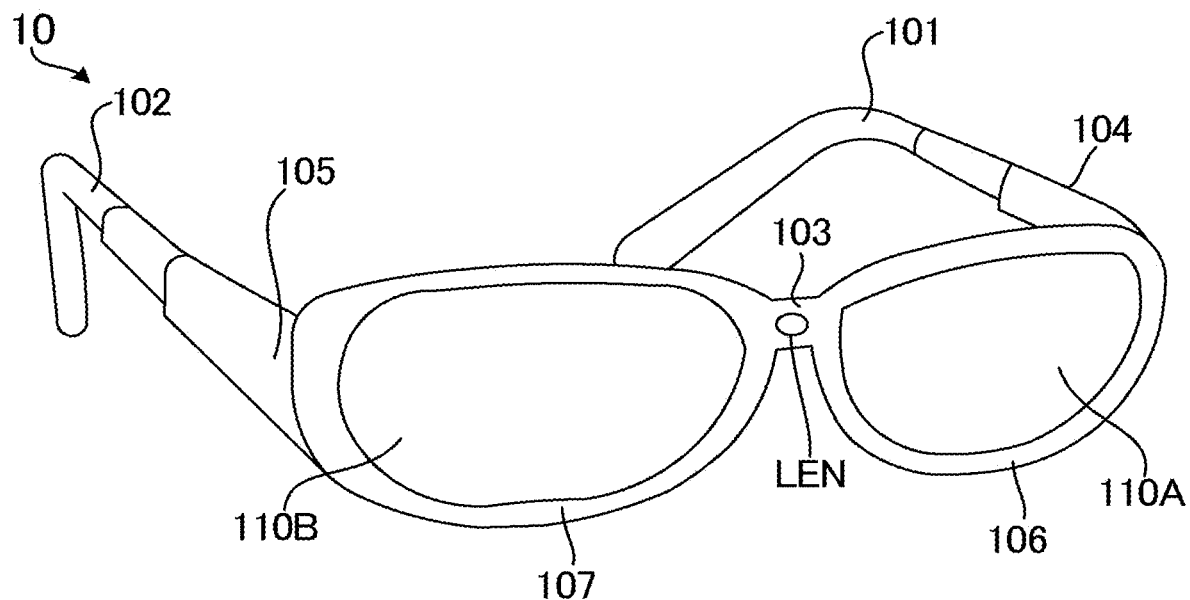
FIG. 3 is an explanatory view illustrating an appearance of a pair of AR glasses 10.

FIG. 3 is an explanatory view illustrating an appearance of the pair of AR glasses 10. As visually recognized from the appearance, the pair of AR glasses 10 includes temples 101 and 102, a nose bridge 103, frames 104 and 105, rims 106 and 107, the lenses 110A and 110B, and an imaging lens LEN.

The imaging lens LEN is disposed on the nose bridge 103. The imaging lens LEN is a constituent of the image capture device 124 illustrated in FIG. 4.

The frame 104 is provided with a left-eye display panel and a left-eye optical member. The display panel is, for example, a liquid crystal panel or an organic electro luminescence (EL) panel. The left-eye display panel displays an image, based on, for example, control by the mobile apparatus 20 (to be described later). The left-eye optical member guides light emitted from the left-eye display panel, to the lens 110A. The frame 104 is also provided with a speaker 122 (to be described later).

The frame 105 is provided with a right-eye display panel and a right-eye optical member. The right-eye display panel displays the image, based on, for example, the control by the mobile apparatus 20. The right-eye optical member guides light emitted from the right-eye display panel, to the lens 110B. The frame 105 is also provided with a speaker 122 (to be described later).

The rim 106 holds the lens 110A. The rim 107 holds the lens 110B.

The lenses 110A and 110B each have a half-mirror. The half mirror of the lens 110A allows light representing a real space R to transmit therethrough, thereby guiding the light representing the real space R to the left eye of the user U. Moreover, the half mirror of the lens 110B reflects the light guided by the left-eye optical member, toward the left eye of the user U. The half mirror of the lens 110B allows the light representing the real space R to transmit therethrough, thereby guiding the light representing the real space R to the right eye of the user U. Moreover, the half mirror of the lens 110B reflects the light guided by the right-eye optical member, toward the right eye of the user U.

When the user U wears the pair of AR glasses 10, the lens 110A and lens 110B are respectively located in front of the left eye and right eye of the user U. The user U wearing the pair of AR glasses 10 is able to visually recognize the real space R represented by the light transmitted through each of the lenses 110A and 110B and a virtual object projected by a projector 121 (to be described later), with the virtual object superimposed on the real space R.

Figure 4:
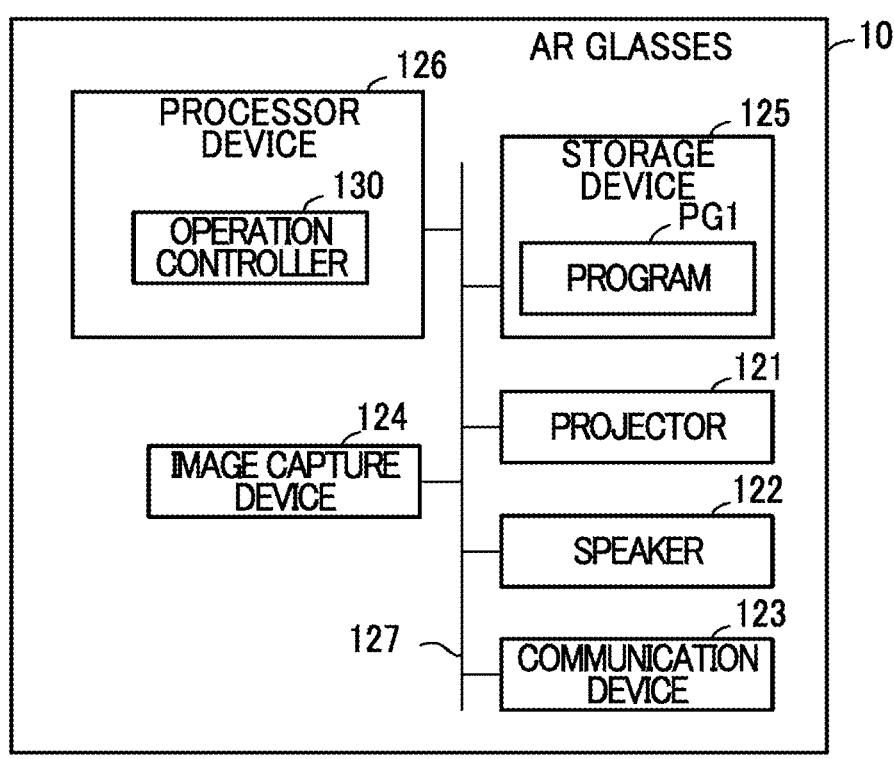
FIG. 4 is a block diagram illustrating a configuration of the pair of AR glasses 10.

FIG. 4 is a block diagram illustrating a configuration of the pair of AR glasses 10. The pair of AR glasses 10 includes the projector 121, the speakers 122, the communication device 123, the image capture device 124, a storage device 125, a processor device 126, and a bus 127, in addition to the foregoing temples 101 and 102, nose bridge 103, frames 104 and 105, rims 106 and 107, lenses 110A and 110B, and imaging lens LEN. The constituents illustrated in FIG. 4 are housed in, for example, the frames 104 and 105. The projector 121, the speakers 122, the communication device 123, the image capture device 124, the storage device 125, and the processor device 126 are connected to each other via the bus 127 so as to exchange information with each other. The bus 127 may be configured with a single bus or may be configured with different buses for elements, such as devices, to be connected to each other.

The projector 121 includes the lens 110A, the left-eye display panel, the left-eye optical member, the lens 110B, the right-eye display panel, and the right-eye optical member. The projector 121 displays the virtual object, based on the control by the mobile apparatus 20. In the present embodiment, the virtual object is, for example, the guide image GI as described above.

The speakers 122 are respectively located on the frames 104 and 105. However, the speakers 122 are not necessarily located on the respective frames 104 and 105. For example, one speaker 122 may be located on one of the frames 104 and 105. Alternatively, one speaker 122 may be located on at least one of the temples 101 and 102. As a further alternative, one speaker 122 may be located on the nose bridge 103. Each speaker 122 is directly controlled by the mobile apparatus 20 or is controlled through the processor device 126 of the pair of AR glasses 10. Each speaker 122 outputs, for example, a work assistance sound such as an alarm sound for urging the user U to use caution during work. The pair of AR glasses 10 does not necessarily include the speakers 122. For example, the speakers 122 may be provided separately from the pair of AR glasses 10.

The communication device 123 communicates with the communication device 203 (see FIG. 4) of the mobile apparatus 20 in a wireless manner or a wired manner. In the present embodiment, the communication device 123 communicates with the communication device 203 of the mobile apparatus 20, using a near-field wireless communication technique such as Bluetooth (registered trademark).

The image capture device 124 outputs a captured image obtained by capturing an image of an area in front of the user U. More specifically, the image capture device 124 captures an image of a subject, and outputs image data D indicating the captured image. In the present embodiment, the image capture device 124 is placed to capture an image in the same direction as the direction of the head of the user U. Therefore, the captured image shows, for example, an object located in front of the user U (i.e., in the direction of a field of view of the user U). The captured image generated by the image capture device 124 is transmitted in the form of the image data D to the mobile apparatus 20 via the communication device 123. The image capture device 124 repeatedly captures images at predetermined imaging intervals, and transmits generated image data D to the mobile apparatus 20 every imaging operation.

The image capture device 124 includes, for example, an imaging optical system and an imaging element. The imaging optical system is an optical system including the at least one imaging lens LEN (see FIG. 3). For example, the imaging optical system may include various optical elements such as an optical prism. Alternatively, the imaging optical system may include a zoom lens, a focus lens, or the like. The imaging element is, for example, a charge-coupled device (CCD) image sensor, a complementary MOS (CMOS) image sensor, or the like.

The storage device 125 is a recording medium readable by the processor device 126. The storage device 125 includes, for example, a nonvolatile memory and a volatile memory. Examples of the nonvolatile memory may include a read only memory (ROM), an erasable programmable read only memory (EPROM), and an electrically erasable programmable read only memory (EEPROM). A non-limiting example of the volatile memory may be a random access memory (RAM). The storage device 125 stores a program PG1.

The processor device 126 includes one or more central processing units (CPUs). The one or more CPUs are an example of one or more processors. The one or more processors and the one or more CPUs are each an example of a computer.

The processor device 126 reads the program PG1 from the storage device 125. The processor device 126 executes the program PG1 to thereby function as an operation controller 130. The operation controller 130 may be configured with a circuit such as a digital signal processor (DSP), an application specific integrated circuit (ASIC), a programmable logic device (PLD), or a field programmable gate array (FPGA).

The operation controller 130 controls operation of the pair of AR glasses 10. For example, the operation controller 130 transmits to the mobile apparatus 20 the captured image captured by the image capture device 124. The operation controller 130 also provides to the projector 121 a control signal for displaying the guide image GI received by the communication device 123 from the mobile apparatus 20. In this case, the projector 121 displays the guide image GI indicated by the control signal, on each display panel.

A-4. Mobile Apparatus 20

The mobile apparatus 20 stores a captured image captured by the image capture device 124 of the pair of AR glasses 10. In addition, the mobile apparatus 20 displays the guide image GI on the pair of AR glasses 10 in a display period TM (to be described later). The mobile apparatus 20 is an example of a controller. Examples of the mobile apparatus 20 may include, but are not limited to, a smartphone and a tablet.

Figure 5:
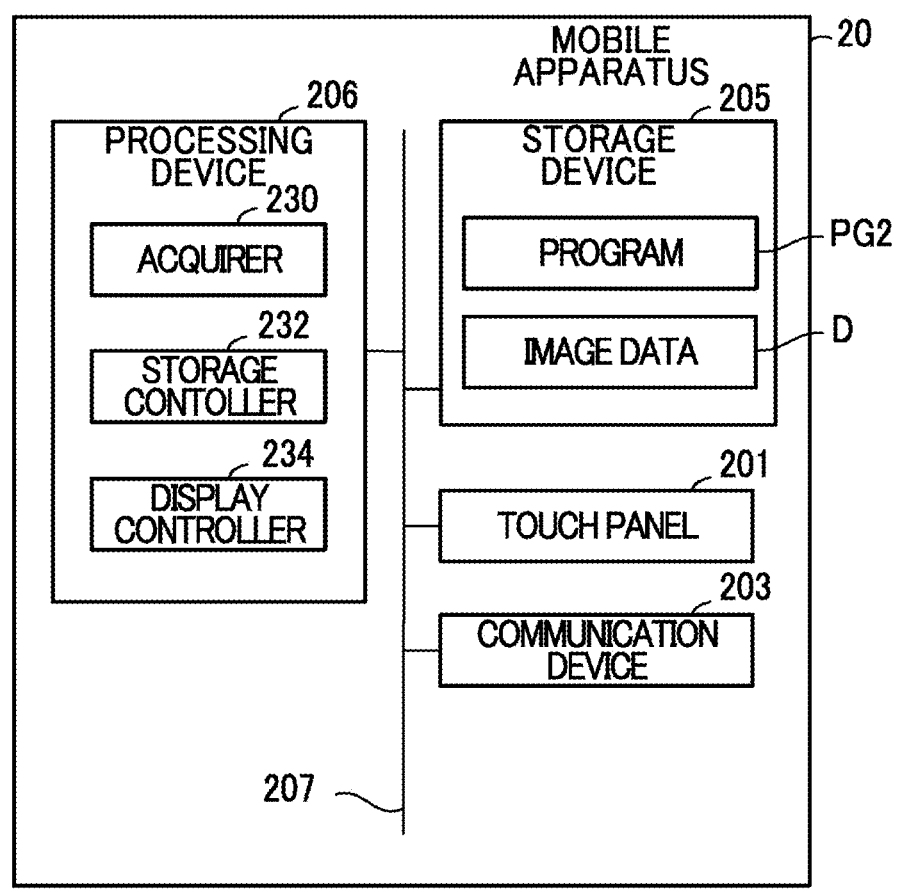
FIG. 5 is a block diagram illustrating a configuration of a mobile apparatus 20.

FIG. 5 is a block diagram illustrating a configuration of the mobile apparatus 20. The mobile apparatus 20 includes a touch panel 201, the communication device 203, the storage device 205, a processor device 206, and a bus 207. The touch panel 201, the communication device 203, the storage device 205, and the processor device 206 are connected to each other via the bus 207 so as to exchange information with each other. The bus 207 may be configured with a single bus or may be configured with different buses for devices to be connected to each other.

The touch panel 201 displays various kinds of information for the user U, and detects a touch operation by the user U. The touch panel 201 serves as an input device and an output device. For example, the touch panel 201 has a laminated structure including a display panel, a cover glass plate, and a touch sensor unit that can detect a touch operation, with the touch sensor interposed between the display panel and the cover glass plate. Examples of the display panel include, but are not limited to, a liquid crystal display panel and an organic EL display panel. For example, when the user U touches the touch panel 201 with a finger, the touch panel 201 periodically detects a contact position on the touch panel 201 where the user U has touched with a finger, and transmits touch information indicating the detected contact position to the processor device 206.

The communication device 203 communicates with the communication device 123 (see FIG. 4) of the pair of AR glasses 10 in a wireless manner or a wired manner. In the present embodiment, the communication device 203 communicates with the communication device 123, using the same near-field wireless communication technique as that for the communication device 123 of the pair of AR glasses 10. The communication device 203 also communicates with the communication device of the inertia measurement device 30 (see FIGS. 1 and 2) in a wireless manner or a wired manner. In the present embodiment, the communication device 203 communicates with the inertia measurement device 30, using the near-field wireless communication technique.

The storage device 205 is a recording medium readable by the processor device 206. The storage device 205 includes, for example, a nonvolatile memory and a volatile memory. Examples of the nonvolatile memory may include a ROM, an EPROM, and an EEPROM. A non-limiting example of the volatile memory may be a RAM. The storage device 205 stores a program PG2 and the captured image.

The image data D corresponds to the captured image captured by the image capture device 124 of the pair of AR glasses 10. As described above, the captured image shows how the user U conducts work on the one or more apparatuses DV.

The processor device 206 includes one or more CPUs. The one or more CPUs are an example of one or more processors. The one or more processors and the one or more CPUs are each an example of a computer.

The processor device 206 reads the program PG2 from the storage device 205. The processor device 206 executes the program PG2 to thereby function as the acquirer 230, a storage controller 232, and a display controller 234. At least one of the acquirer 230, the storage controller 232, and the display controller 234 may be configured with a circuit such as a DSP, an ASIC, a PLD, or an FPGA.

The acquirer 230 acquires an output signal from the inertia measurement device 30. The acquirer 230 also acquires the image data D corresponding to the captured image captured by the image capture device 124 of the pair of AR glasses 10. The acquirer 230 acquires the output signal from the inertia measurement device 30 and the image data D indicating the captured image, via the communication device 203. The acquirer 230 acquires the output signal and the image data D in succession during the work conducted by the user U.

The storage controller 232 stores the image data D acquired by the acquirer 230, in the storage device 205. The storage controller 232 may store the image data D with the resolution of the image data D reduced in accordance with, for example, a capacity of the storage device 205. In addition, the storage controller 232 may ensure the capacity of the storage device 205 by sequentially erasing image data D that has been stored in the storage device 205 for a predetermined period or more.

The display controller 234 displays on the pair of AR glasses 10 the guide image GI indicating the outer edge of the captured image. As described above, image capture devices 124 mounted to the pair of AR glasses 10 differ in resolution and mounting position for each product. Therefore, an imaging range IF which the user U assumes is different from an actual imaging range IF in some cases. Particularly in a case in which a visual field range VF of the user U changes, there is a possibility that the imaging range IF which the user U assumes deviates from the actual imaging range IF. Assumed examples of the case in which the visual field range VF of the user U changes may include, but are not limited to, a case in which the user U moves to a position in front of a certain one of the apparatuses DV as a target object and starts to conduct work on the apparatus DV, and a case in which the user U looks around during the work and then returns a line of sight to the apparatus DV of interest.

Figure 6:
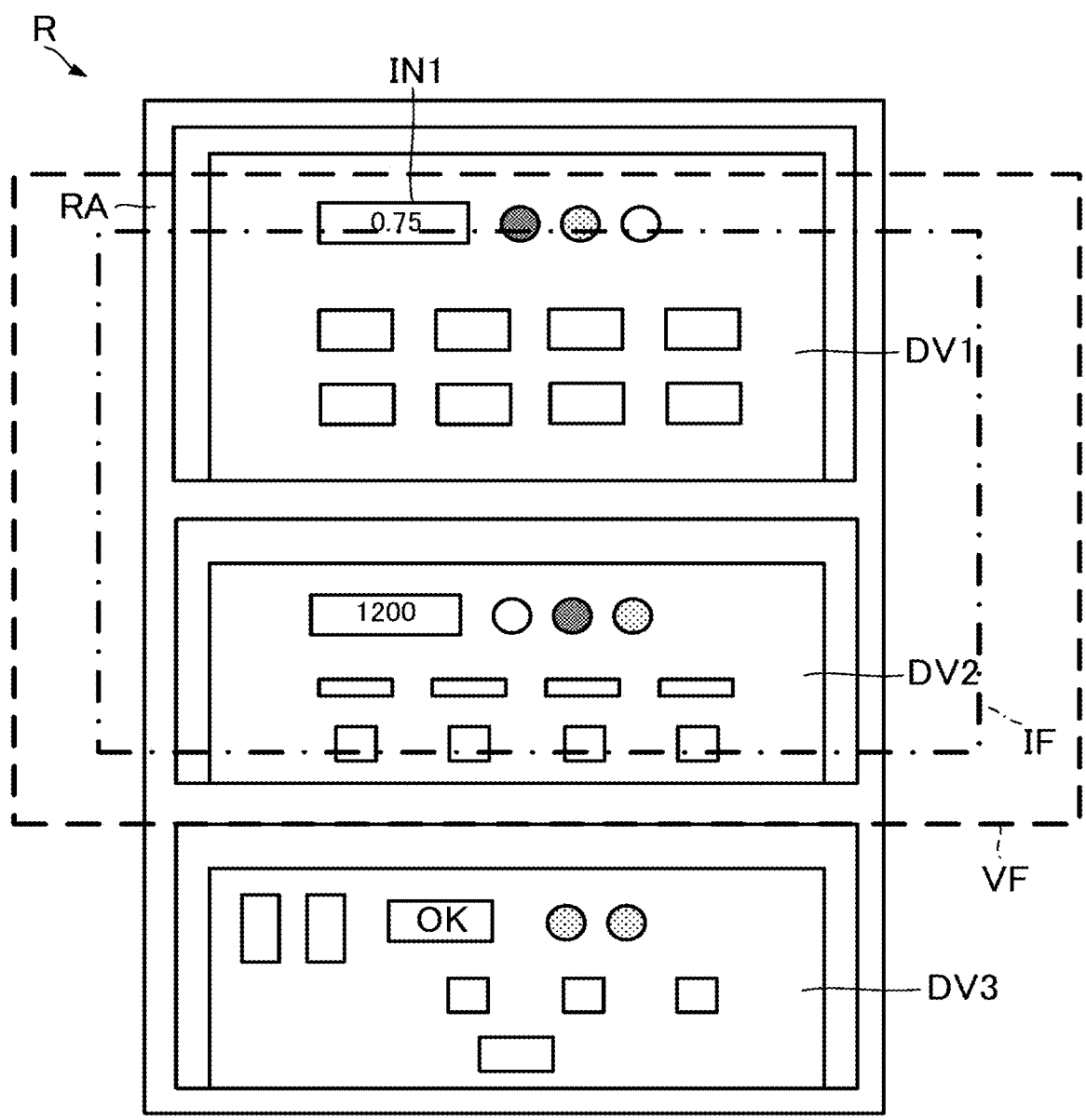
FIG. 6 is a front view of an apparatus DV1.

FIG. 6 is a diagram schematically illustrating a relationship between the visual field range VF of the user U and the imaging range IF of the image capture device 124 in the real space R. FIG. 6 illustrates a state in which the user U is located in front of the rack RA housing the apparatuses DV1 to DV3, and looks toward the apparatuses DV1 to DV3. For convenience of illustration, the visual field range VF of the user U illustrated in FIG. 6 is narrower than an actual one.

Typically, the visual field range VF of the user U extends at an angle of approximately 200°, that is, extends leftward at an angle of approximately 100° and rightward at an angle of approximately 100° with respect to a line-of-sight direction. In contrast to this, the image capture device 124 has an angle of view that is approximately 80° even when the image capture device 124 includes an ultrawide-angle lens that is wider in angle of view than a telephoto lens. That is, the imaging range IF of the image capture device 124 is narrower than the visual field range VF of the user U. Therefore, there is a possibility that the captured image does not show an object which the user U looks at.

For example, it is assumed that the user U needs to connect the apparatus DV1 to the apparatus DV2 while confirming a value on an indicator IN1 provided on the apparatus DV1. In this case, it is necessary that the indicator IN1 be shown in the captured image in order to evaluate after the work whether the user U conducted the work appropriately. In the case of the imaging range IF illustrated in FIG. 6, the user U is able to recognize the value on the indicator IN1 in the visual field range VF. However, the indicator IN1 is outside the imaging range IF. Therefore, the user U needs to adjust the orientation of the image capture device 124. For example, the user U directs the head upward to move the imaging range IF of the image capture device 124 upward. The imaging range IF thus covers the indicator IN1 in response to this movement.

In order to enable an adjustment to a position of the imaging range IF in the visual field range VF, the display controller 234 displays on the pair of AR glasses 10 the guide image GI that allows the user U to grasp the imaging range IF.

Figure 7A:
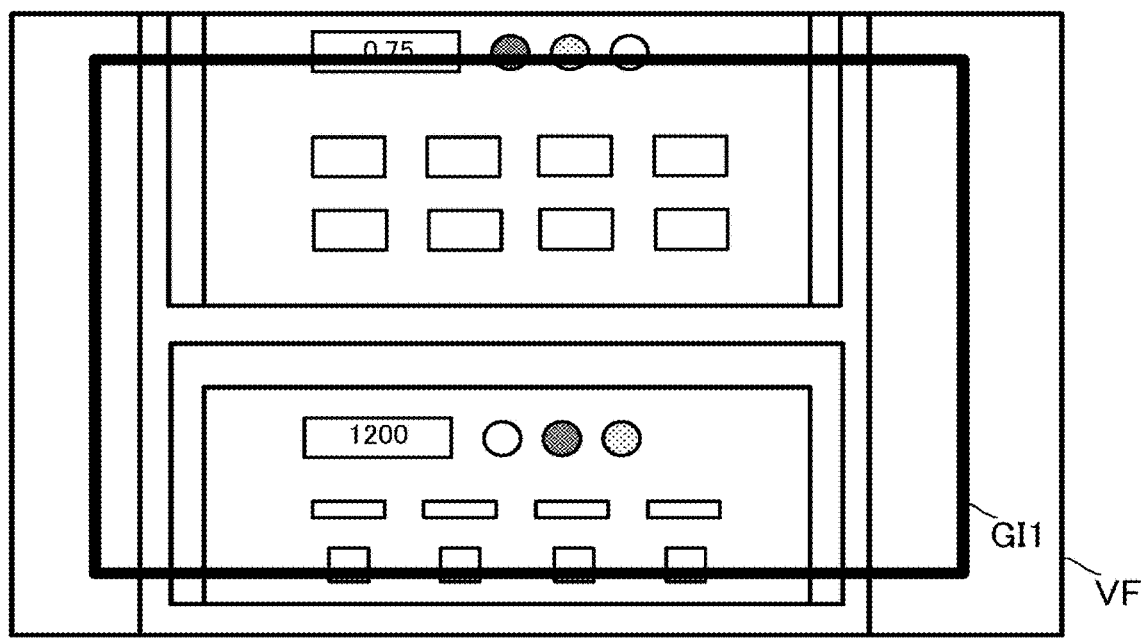
FIG. 7A is a diagram illustrating a relationship between the apparatus DV1 and an X-Y coordinate system in a real space.
Figure 7B:
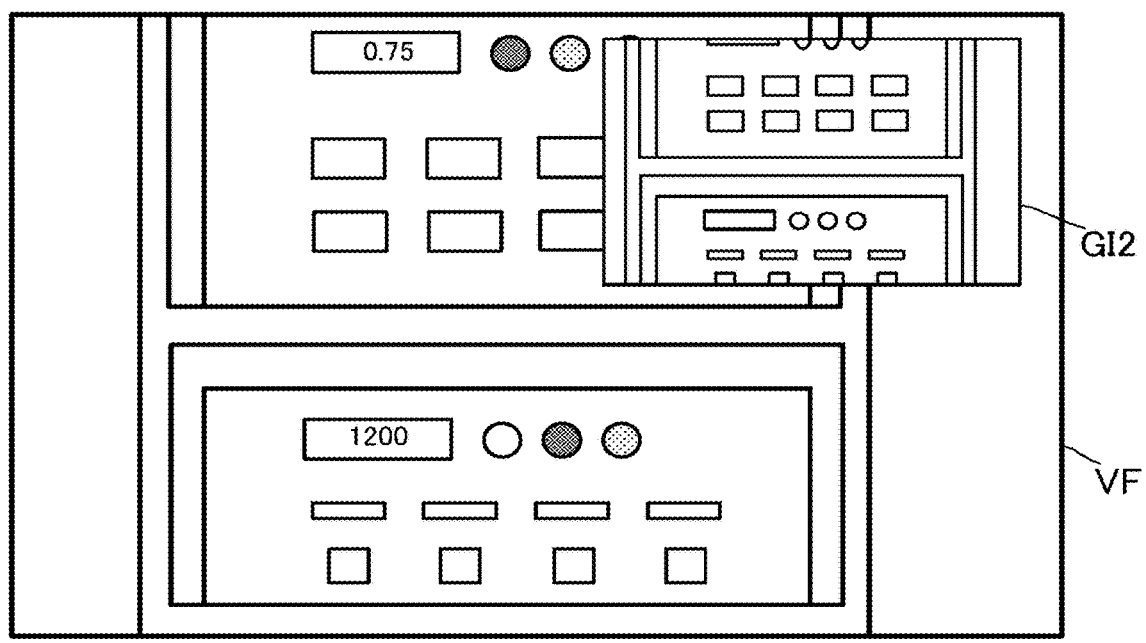
FIG. 7B is a diagram illustrating a relationship between the apparatus DV1 and the X-Y coordinate system in the real space.

FIG. 7A is an explanatory view illustrating an example display mode of the guide image GI. In FIG. 7A and FIG. 7B (described later), the user U visually recognizes the visual field range VF through the lenses 110A and 110B of the pair of AR glasses 10. In the example in FIG. 7A, a guide image GI1 is a frame-shaped image indicating an outer edge of the imaging range IF. The display controller 234 displays the guide image GI1 on each of the lenses 110A and 110B, using the projector 121. The user U is thus able to recognize which area of the visual field range VF covers the imaging range IF.

In a case in which the image capture device 124 and the lenses 110A and 110B are in a fixed positional relationship, the image capture device 124 has no pan, tilt, and zoom capabilities, and the imaging range IF is therefore fixed, the guide image GI1 has a fixed size and is displayed at a fixed position on each of the lenses 110A and 110B. For example, in a case in which the image capture device 124 has pan, tilt, and zoom capabilities and the size and direction of the imaging range IF are therefore variable, the display controller 234 calculates a position of the outer edge of the imaging range IF (i.e., the outer edge of the captured image) in the visual field range VF of the user U to display the guide image GI1.

FIG. 7B is an explanatory view illustrating another example display mode of the guide image GI. In the example of FIG. 7B, a guide image GI2 is a captured image that is captured by the image capture device 124 and is displayed in real-time. The display controller 234 displays a captured image that is captured by the image capture device 124 and is scaled down, as the guide image GI2 on each of the lenses 110A and 110B, using the projector 121. The user U is thus able to grasp how the visual field range VF is shown as the captured image.

In the example of FIG. 6, the imaging range IF of the image capture device 124 entirely falls within the visual field range VF of the user U. In some cases, part of the imaging range IF of the image capture device 124 does not fall within the visual field range VF of the user U. For example, the image capture device 124 may be provided at a position corresponding to the forehead of the user U depending on the design of the pair of AR glasses 10. In this case, the imaging range IF of the image capture device 124 may cover an area above the visual field range VF of the user U. Also in this case, displaying the guide image GI allows the user U to recognize misalignment of the imaging range IF from the visual field range VF.

A guide image GI such as those illustrated in FIGS. 7A and 7B is considerably convenient in a case in which the visual field range VF of the user U changes, but may hinder the work conducted by the user U after the alignment of the imaging range IF in the visual field range VF. Therefore, the display controller 234 displays the guide image GI in a limited fashion only in a certain period immediately before a stop of the movement of the user U. Specifically, the display controller 234 displays the guide image GI indicating the outer edge of the captured image, on the pair of AR glasses 10 in the display period TM from a start timing to an end timing, the display period TM being determined based on at least the output signal from the inertia measurement device 30.

Figure 8:
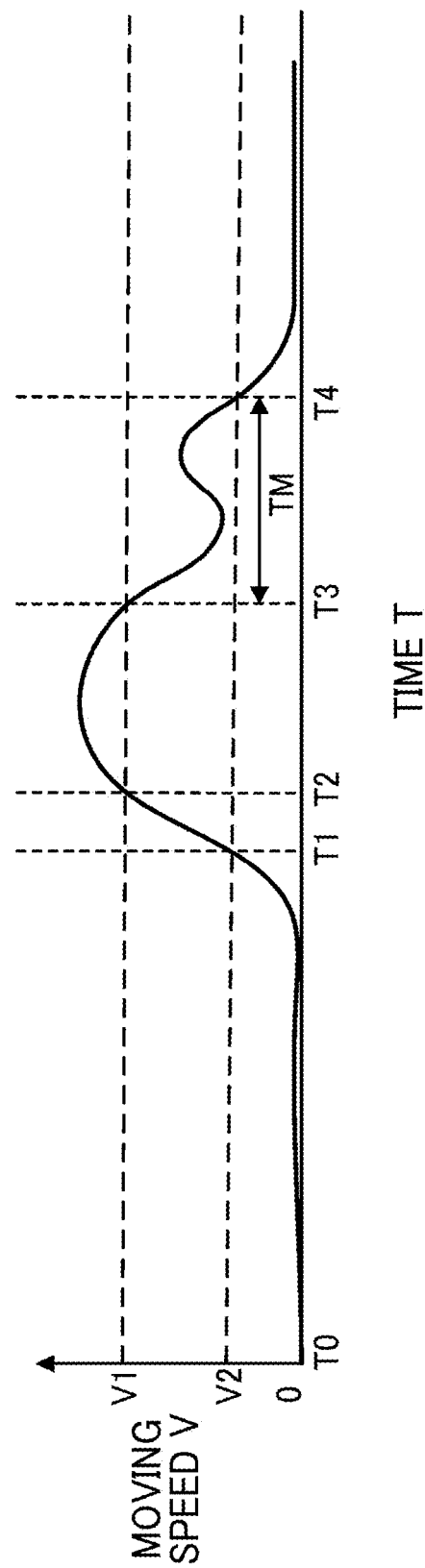
FIG. 8 is a diagram illustrating a relationship between a captured image showing the apparatus DV1 and an x-y coordinate system.

FIG. 8 is a graph schematically illustrating the display period TM of the guide image GI. In the graph in FIG. 8, the vertical axis represents a moving speed V of the head of the user U, and the horizontal axis represents a time T. The moving speed V is calculated by time integration on an acceleration measured by the inertia measurement device 30. Two threshold values, that is, a speed V1 and a speed V2 (<V1) are set for the moving speed V. The speed V1 is an example of a first threshold value. The speed V2 is an example of a second threshold value. A first state refers to a state in which the moving speed V is more than the speed V1. A second state refers to a state in which the moving speed V is more than the speed V2 and is equal to or less than the first threshold value. A third state refers to a state in which the moving speed V is equal to or less than the speed V2.

As illustrated in the graph of FIG. 8, the moving speed V of the head of the user U is approximately zero at a time T0. Thereafter, the head of the user U starts to move. At a time T1, the moving speed V exceeds the speed V2. After the time T1, the moving speed V continuously increases. At a time T2, the moving speed V exceeds the speed V1. After exceeding the speed V1 at the time T2, the moving speed V reaches a peak. After the peak, the moving speed V decreases. At a time T3, the moving speed V reaches or falls below the speed V1. After the time T3, although the moving speed V increases again in some time zones, the moving speed V decreases without exceeding the speed V1. At a time T4, the moving speed V reaches or falls below the speed V2. After the time T4, the moving speed V becomes approximately zero to approach a stationary state. That is, the period from the time T0 to the time T1 corresponds to the third state. The period from the time T1 to the time T2 corresponds to the second state. The period from the time T2 to the time T3 corresponds to the first state. The period from the time T3 to the time T4 corresponds to the second state. The period after the time T4 corresponds to the third state.

The display controller 234 displays the guide image GI on the pair of AR glasses 10 during the period from the time T3 to the time T4. That is, the display controller 234 sets the period from the time T3 to the time T4 for the display period TM of the guide image GI. The period from the time T3 to the time T4 is set for the display period TM since it is considered that the highest usability is achieved when the guide image GI is displayed in this period.

For example, in a state in which the user U's movement shows an acceleration or the moving speed V is large (e.g., exceeding the speed V1), such as in the period from the time T1 to the time T3, the visual field range VF changes greatly. Therefore, even when the guide image GI is displayed in this period, the usability is low. On the other hand, when the moving speed V which has exceeded the speed V1 reaches or falls below the speed V1, such as at the time T3, the user U highly tends to stop moving. When the moving speed V decreases, the visual field range VF of the user U changes slightly. This state facilitates alignment of the imaging range IF based on the guide image GI. Therefore, the display controller 234 starts to display the guide image GI on the pair of AR glasses 10. In addition, when the moving speed V reaches or falls below the speed V2, the movement of the user U almost ends, and the user U may resume the work. Therefore, the display controller 234 ends the display of the guide image GI on the pair of AR glasses 10. As described above, when the guide image GI is displayed before the user U completely stops, the user U is able to place the imaging range IF at a desired position through a series of motions during the movement.

In other words, the display controller 234 calculates the moving speed V of the head of the user U, based on the acceleration indicated by the output signal from the inertia measurement device 30. The display controller 234 sets, as the first state, the state in which the moving speed V is more than the speed V1. The display controller 234 sets, as the second state, the state in which the moving speed V is equal to or less than the speed V1 and is more than the speed V2. The display controller 234 sets, as the third state, the state in which the moving speed V is equal to or less than the speed V2. The display controller 234 sets the timing when the first state transitions to the second state, as the start timing of the display period TM. The display controller 234 sets the timing the second state transitions to the third state, as the end timing of the display period TM.

A-5. Operation of Processor Device 206

Figure 9:
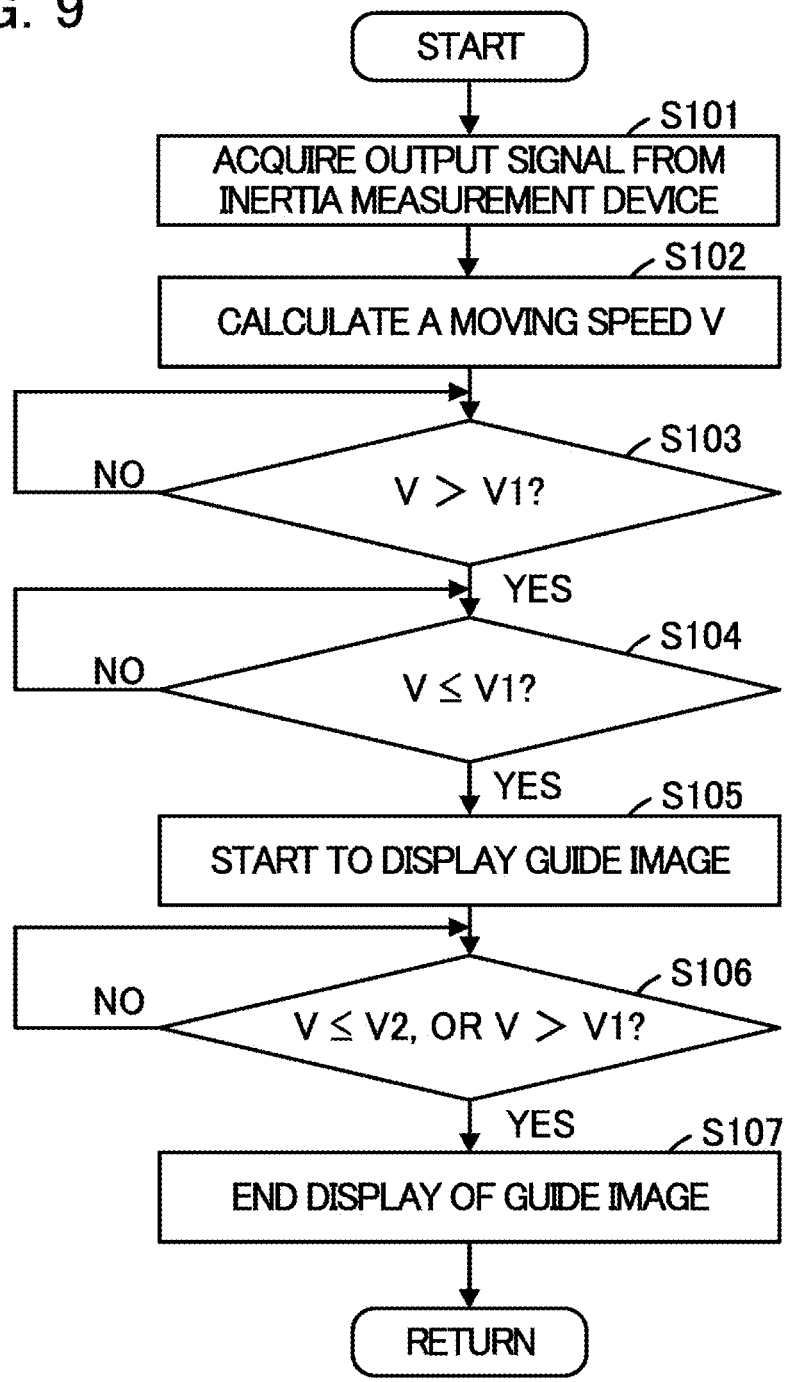
FIG. 9 is a flowchart illustrating operation of a processor device 206.

FIG. 9 is a flowchart illustrating operation of the processor device 206. The processor device 206 functions as the acquirer 230 to acquire an output signal from the inertia measurement device 30 (step S101). The output signal from the inertia measurement device 30 indicates an acceleration of the head of the user U. The processor device 206 functions as the display controller 234 to calculate a moving speed V of the head of the user U, using the output signal from the inertia measurement device 30 (step S102). It should be noted that step S101 of acquiring an output signal from the inertia measurement device 30 and step S102 of calculating a moving speed V are carried out in succession even in the subsequent steps.

The processor device 206 functions as the display controller 234 to hold a standby state until the moving speed V exceeds the speed V1, that is, until state transition to the first state occurs (step S103: NO). When the moving speed V exceeds the speed V1 (step S103: YES), the processor device 206 functions as the display controller 234 to hold the standby state until the moving speed V reaches or falls below the speed V1, that is, until the first state transitions to the second state (step S104: NO).

When the moving speed V reaches or falls below the speed V1 (step S104: YES), the processor device 206 functions as the display controller 234 to start to display the guide image GI on the pair of AR glasses 10 (step S105). That is, the start timing of the display period TM corresponds to the timing when the first state transitions to the second state. The processor device 206 functions as the display controller 234 to hold the standby state until the moving speed V reaches or falls below the speed V2 or until the moving speed V exceeds the speed V1 again (step S106: NO). During this period, the guide image GI is continuously displayed on the pair of AR glasses 10.

When the moving speed V reaches or falls below the speed V2 or when the moving speed V exceeds the speed V1 again (step S106: YES), the processor device 206 functions as the display controller 234 to end the display of the guide image GI on the pair of AR glasses 10 (step S107). That is, the end timing of the display period TM corresponds to the timing when the second state transitions to the third state occurs or the timing when the second state transitions to the first state. Thereafter, the processor device 206 returns the processing to step S101, and carries out the steps thereafter again.

A-6. Summary of Embodiment

As described above, according to the embodiment, in the wearable apparatus 1, the pair of AR glasses 10 displays the guide image GI indicating the outer edge of the captured image, in the display period TM from the start timing to the end timing, the display period TM being determined based on the output signal from the inertia measurement device 30. The guide image GI is displayed during only the display period TM. This configuration avoids the field of view of the user U from being interrupted for a long time due to display of the imaging range IF of the image capture device 124. In addition, the user U is able to grasp from the guide image GI the position of the imaging range IF in the visual field range VF. This configuration improves the usability of the captured image.

Also in the wearable apparatus 1, the timing when the first state transitions to the second state is set for the start timing of the display period TM, and the timing when the second state transitions to the third state is set for the end timing of the display period TM. Therefore, reducing the moving speed V results in suppression of a change in the visual field range VF of the user U, so that the guide image GI is displayed at the timing when alignment of the imaging range IF is performed based on the guide image GI with ease. This configuration improves the usability of the guide image GI.

Also in the wearable apparatus 1, the inertia measurement device 30 acquires the physical quantity concerning the movement of the head of the user U. The wearable apparatus 1 is thus configured to accurately detect the physical quantity concerning the movement of the head of the user U.

B: Modifications

The following will describe various modifications of the foregoing embodiment. Two or more modifications optionally selected from among the following modifications may be combined as appropriate within a mutually inconsistent range.

B1: First Modification

For example, when the user U is skilled in the work, a state in which the user U is moving shortly shifts to a state in which the user U is stopping, which may considerably shorten the display period TM of the guide image GI. If the display period TM of the guide image GI is too short, the display of the guide image GI ends before the user U checks the imaging range IF, which may lower the usability of the displayed guide image GI. In view of this, when the display period TM is short, the display controller 234 may continuously display the guide image GI for a certain time after the moving speed V of the user U reaches or falls below the speed V2.

That is, when a duration from the start timing to the end timing of the display period TM is equal to or less than a first period of time, the display controller 234 may display the guide image GI for a second period of time longer than the first period of time. The first period of time and the second period of time each represent a length of a time.

According to the first modification, when the display period TM is equal to or less than the first period of time, the guide image GI is displayed for the second period of time. This configuration ensures a time when the user U checks the guide image GI and improves convenience.

B2: Second Modification

Depending on, for example, the movement of the user U, the state in which the moving speed V is equal to or less than the speed V1 and is greater than the speed V2 may continue for a long time. In this case, since the guide image GI is continuously displayed within the visual field range VF of the user U for a long time, the user U may feel it troublesome. In view of this, when the display period TM continues for a long time, the display controller 234 may end the display of the guide image GI irrespective of the moving speed V of the user U.

That is, when the display period TM continues for a third period of time or longer, the display controller 234 may end the display of the guide image GI irrespective of an output signal from the inertia measurement device 30.

According to the second modification, when the display period TM continues for the third period of time or longer, the display of the guide image GI ends irrespective of the output signal from the inertia measurement device 30 (i.e., the moving speed V of the user U). This configuration stops unnecessary display of the guide image GI, and thereby ensures the visibility in the field of view of the user U.

B3: Third Modification

In the foregoing embodiment, the pair of AR glasses 10 and the mobile apparatus 20 are provided separately from each other. Alternatively, the pair of AR glasses 10 may have the functions of the mobile apparatus 20, for example. That is, the processor device 126 of the pair of AR glasses 10 may function as the acquirer 230, the storage controller 232, and the display controller 234. Moreover, the storage device 125 of the pair of AR glasses 10 may store the image data D.

According to the third modification, the wearable apparatus 1 is configured to display the guide image GI and to record the captured image without the mobile apparatus 20, for example.

B4: Fourth Modification

In the foregoing embodiment, the display control is performed on the guide image GI by the mobile apparatus 20. Alternatively, the display control may be performed on the guide image GI by a processing server connected to the mobile apparatus 20 via a network, for example. In this case, the mobile apparatus 20 transmits, to the processing server, an output signal that is output from the inertia measurement device 30 and is acquired by the acquirer 230. The processing server determines the display period TM of the guide image GI, based on the output signal from the inertia measurement device 30, and transmits to the mobile apparatus 20 a control signal for displaying the guide image GI on the pair of AR glasses 10.

According to the fourth modification, the user U monitors a monitoring target during the work even in a case in which the mobile apparatus 20 has no program for implementing the display controller 234 or has no processing ability to execute a program for implementing the display controller 234.

B5: Fifth Modification

In the foregoing embodiment, the pair of AR glasses 10 is equipped with the image capture device 124. Alternatively, the pair of AR glasses 10 and the image capture device 124 may be provided separately from each other, for example.

B6: Sixth Modification

In the foregoing embodiment, the inertia measurement device 30 is used for acquiring information on the movement of the head of the user U. Alternatively, a geomagnetic sensor may be used as a sensor for detecting a physical quantity, for example. The geomagnetic sensor detects the terrestrial magnetic field surrounding the Earth. The geomagnetic sensor detects values of magnetic force in an X-axis direction, a Y-axis direction, and a Z-axis direction. The mobile apparatus 20 is thus configured to estimate a displacement (i.e., a direction and amount of displacement) of the head of the user U, based on changes in the values of magnetic force in the X-axis direction, Y-axis direction, and Z-axis direction. In addition, the amount of displacement of the head of the user U per unit time corresponds to the moving speed V of the user U. Therefore, the use of the geomagnetic sensor also enables processing similar to that described in the foregoing embodiment.

C: Other Matters (1) Each function illustrated in FIG. 4 or 5 is implemented by a given combination of hardware with software. The method of implementing each function is not particularly limited. Each function may be implemented using a physically or logically coupled single device or may be implemented using two or more devices that are physically or logically separated from each other, by connecting the two or more devices directly or indirectly (e.g., in a wired manner or a wireless manner). Each function may be implemented by a combination of the single device or the two or more devices with software.

(2) In the present specification, the term "apparatus" may be replaced with another term such as a circuit, a device, or a unit.

(3) In the foregoing embodiment and each of the first to sixth modifications, the storage device 125 and the storage device 205 each may be configured with at least one of an optical disc such as a compact disc ROM (CD-ROM), a hard disk drive, a flexible disc, a magneto-optical disc (e.g., a compact disc, a digital versatile disc, a Blu-ray (registered trademark) disc), a smart card, a flash memory (e.g., a card, a stick, a key drive), a floppy (registered trademark) disc, a magnetic strip, or the like. The programs may be transmitted from a network via a telecommunication line.

(4) The foregoing embodiment and each of the first to sixth modifications may be applied to at least one of systems using Long Term Evolution (LTE), LTA-Advanced (LTE-A), SUPER 3G, IMT-Advanced, 4th Generation Mobile Communication System (4G), 5th Generation Mobile Communication System (5G), 6th Generation Mobile Communication System (6G), xth Generation Mobile Communication System (xG) (x: an integer or a decimal fraction), Future Radio Access (FRA), New Radio (NR), New Radio Access (NX), Future Generation Radio Access (FX), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), and other suitable systems, and next-generation systems extended, modified, formed, and defined based on these systems. In addition, the plurality of systems may be applied in combination (e.g., a combination of at least one of LTE and LTE-A with 5G).

(5) With regard to the processing procedures, the sequences, the flowcharts, or the like exemplified in the foregoing embodiment and each of the first to sixth modifications, the order may be changed unless a conflict arises. For example, the methods described in the present specification present various step elements in an exemplary order; however, the methods are not limited to the specific presented order.

(6) In the foregoing embodiment and each of the first to sixth modifications, for example, input or output information may be stored in a specific location (e.g., a memory) or may be managed using a management table. For example, information to be input or output may be overwritten, updated, or additionally written. For example, the output information may be deleted. For example, the input information may be transmitted to another apparatus.

(7) In the foregoing embodiment and each of the first to sixth modifications, a determination may be made based on a value (0 or 1) represented by one bit, may be made based on a true or false value (Boolean), or may be made based on a comparison between numerical values (e.g., a comparison with a predetermined value).

(8) The programs exemplified in the foregoing embodiment and each of the first to sixth modifications should be broadly construed to involve an instruction, an instruction set, a code, a code segment, a program code, a subprogram, a software module, an application, a software application, a software package, a routine, a subroutine, an object, an executable file, an execution thread, a procedure, a function, or the like, regardless of whether the programs are each called software, firmware, middleware, microcode, hardware description language, or by another name. For example, software or a command may be transmitted and received via a transmission medium. For example, in a case in which software is transmitted from a website, a server, or another remote source, using at least one of a wired technique (e.g., a coaxial cable, a fiber optic cable, a twisted pair cable, a digital subscriber line (DSL)) and a wireless technique (e.g., an infrared ray, a microwave), at least one of the wired technique and the wireless technique is included within the definition of the transmission medium.

(9) The information and the like described in the foregoing embodiment and each of the first to sixth modifications may be represented using any of a variety of different technologies. For example, data, information, or the like that may be mentioned throughout the foregoing description may be represented by a voltage, a current, an electromagnetic wave, a magnetic fields, a magnetic particle, an optical field, a photon, or a given combination thereof. It should be noted that the terms described in the present specification and terms required for an understanding of the present specification may be replaced with terms having the same or similar meanings.

(10) In the foregoing embodiment and each of the first to sixth modifications, the terms "system" and "network" are used in an interchangeable manner.

(11) In the foregoing embodiment and each of the first to sixth modifications, the mobile apparatus 20 or 20B may be a mobile station. The mobile station may be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or another suitable term by one skilled in the art.

(12) The mobile station may also be called a transmission device, a reception device, a communication device, or the like. The mobile station may be a device mounted on a mobile body, a mobile body itself, or the like. The mobile body refers to a movable object. The mobile body is movable at a given moving speed. The mobile body is stoppable. Examples of the mobile body may include, but not limited to, a vehicle, a transport vehicle, an automobile, a motorcycle, a bicycle, a connected car, a power shovel, a bulldozer, a wheel loader, a dump truck, a forklift, a train, a bus, a bicycle trailer, a rickshaw, a ship and other watercraft, an airplane, a rocket, an artificial satellite, a drone (registered trademark), a multicopter, a quadcopter, a balloon, and objects mounted thereat. The mobile body may be a mobile body that autonomously travels based on an operation command. The mobile body may be a conveyance (e.g., a vehicle, an airplane). The mobile body may alternatively be an uncrewed mobile body (e.g., a drone, a self-driving vehicle). The mobile body may alternatively be a robot (of a crewed type or an uncrewed type). The mobile station also includes a device that does not necessarily move during communication operations. For example, the mobile station may be an Internet-of-Things (IoT) apparatus such as a sensor.

(13) The term "determining" as used in the foregoing embodiment and each of the first to sixth modifications may involve a variety of different operations. For example, the term "determining" may involve "judging", "calculating", "computing", "processing", "deriving", "investigating" "looking up, searching for, making an inquiry) (e.g., searching a table, a database, or another data structure), and "ascertaining" to be regarded as "determining". For example, the term "determining" may also involve "receiving" (e.g., receiving information), "transmitting" (e.g., transmitting information), "inputting", "outputting", and "accessing" (e.g., accessing data in a memory) to be regarded as "determining". For example, the term "determining" may also involve "resolving", "selecting", "choosing", "establishing", and "comparing" to be regarded as "determining". That is, the term "determining" may involve a given sort of action to be regarded as "determining". For example, the term "determining" may be understood as "assuming", "expecting", or "considering".

(14) In the foregoing embodiment and each of the first to sixth modifications, the term "connected" or other given transformations thereof can refer to any direct or indirect connection or coupling between two or more elements, and can involve the presence of one or more intermediate elements between two elements that are "connected" or "coupled" together. A coupling or connection between elements may be a physical coupling or connection, may be a logical coupling or connection, or may be a combination thereof. For example, the term "connection" may be understood as "access". It can be appreciated in the present disclosure that two elements are "connected" or "coupled" together using at least one of one or more electric wires, one or more cables, and one or more printed electrical connections and using, as some non-limiting and non-comprehensive examples, electromagnetic energy at wavelengths in a radio frequency range, a microwave range, and an optical (both visible and invisible) range.

(15) In the foregoing embodiment and each of the first to sixth modifications, the phrase "based on" does not involve "based only on" unless otherwise specified. In other words, the phrase "based on" involves both "based only on" and "based at least on".

(16) References to the elements designated as "first", "second", and the like in the present specification do not collectively limit the amounts or the order of the elements. In the present specification, the designations are usable as a useful method for discriminating between two or more elements. Therefore, references to the first and second elements do not mean that only the two elements can be adopted or the first element should be followed by the second element in any manner.

(17) In the foregoing embodiment and each of the first to sixth modifications, the terms "include" and "including" as well as transformations thereof are intended to be open-ended as in the term "comprising" in a case in which these terms are used in the present specification or the claims. In addition, the term "or" as used in the present specification or the claims is not intended to be an exclusive OR.

(18) Throughout the present application, for example, a singular feature, element, or step preceded with an article such as "a", "an", or "the" in the English translation may be understood as including plural features, elements, or steps.

(19) It is obvious to one skilled in the art that the present invention is not limited to the embodiment described in the present specification. The present invention can be implemented as modifications or variations without departing from the spirit and scope of the present invention defined by the recitations in the claims. Therefore, the description in the present specification is given for the purpose of exemplification and has no restrictive meaning to the present invention. In addition, multiple aspects exemplified in the present specification may be combined.

DESCRIPTION OF REFERENCE SIGNS

1: wearable apparatus, 10: pair of AR glasses, 20: mobile apparatus, 30: inertia measurement device, 201: touch panel, 203: communication device, 205: storage device, 206: processor device, 207: bus, 230: acquirer, 232: storage controller, 234: display controller, DV (DV1 to DV3): apparatus, GI (GI1, GI2): guide image, IF: imaging range, R: real space, U: user, VF: visual field range.

The invention claimed is:

1. A wearable apparatus comprising:
a display device of a transmission type mountable to a head of a user;
an image capture device configured to output a captured image obtained by capturing an image of an area in front of the user;
a sensor configured to detect a physical quantity; and
a controller configured to display on the display device a guide image indicating an outer edge of the captured image, in a display period from a start timing to an end timing determined based on at least an output signal from the sensor,
wherein
the physical quantity concerns a movement of the head,
the controller is configured to calculate a moving speed of the head, based on the physical quantity indicated by the output signal, to
set, as a first state, a state in which the moving speed is more than a first threshold value,
set, as a second state, a state in which the moving speed is more than a second threshold value and equal to or less than the first threshold value, the second threshold value being less than the first threshold value,
set, as a third state, a state in which the moving speed is equal to or less than the second threshold value,
set, as the start timing, a timing when the first state transitions to the second state, and
set, as the end timing, a timing when the second state transitions to the third state.

2. The wearable apparatus according to claim 1, wherein when a duration from the start timing to the end timing is equal to or less than a first period of time, the controller is configured to continue display of the guide image for a second period of time longer than the first period of time.

3. The wearable apparatus according to claim 1, wherein when the display period continues for a third period of time or longer, the controller is configured to end display of the guide image irrespective of the output signal.

4. The wearable apparatus according to claim 1, wherein the sensor comprises an inertia measurement device or a geomagnetic sensor.

* * * * *